(12) United States Patent
Griffith et al.

(10) Patent No.: US 7,549,120 B1
(45) Date of Patent: Jun. 16, 2009

(54) METHOD AND SYSTEM FOR ANALYZING A PRESENTATION

(75) Inventors: Tim Griffith, Southampton (GB);
Bernard Z. Kufluk, Southampton (GB);
Samuel J. Smith, Southampton (GB);
Philip R. Taunton, Eastleigh (GB);
Robert J. Breeds, Swindon (GB); Ian Heritage, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,547

(22) Filed: Apr. 7, 2008

(51) Int. Cl.
*G06F 17/00* (2006.01)
(52) U.S. Cl. .................... 715/234; 715/231
(58) Field of Classification Search ............... 715/200, 715/202–204, 230–231, 233, 234, 237, 704, 715/731–732, 753, 863
See application file for complete search history.

(56) References Cited

FOREIGN PATENT DOCUMENTS

| JP | 01129352 | 5/1989 |
|----|----------|--------|
| JP | 2000193765 | 7/2000 |

*Primary Examiner*—William L Bashore
*Assistant Examiner*—Manglesh M Patel
(74) *Attorney, Agent, or Firm*—Suiter Swantz pc llo

(57) ABSTRACT

A method for analyzing a presentation structure and content including providing a presentation markup, receiving one or more logical attributes for the presentation key point, assigning a time value and an importance weight to a presentation key point utilizing the one or more logical attributes, generating a summary of the presentation, detecting a logical attribute during the presentation and marking the local attribute as located, detecting a presenter behavior pattern detecting a presenter speech pattern; providing a real-time notification of at least one of the presenter behavior pattern or the presenter speech pattern via an external device having a display viewable to the presenter but not to an audience; recording voice input of the presentation; providing an analysis of the presentation generated by analyzing at least one key point in the presentation; and providing an edited playback of the presentation.

6 Claims, 2 Drawing Sheets

METHOD AND SYSTEM FOR ANALYZING A PRESENTATION

TECHNICAL FIELD

The present disclosure generally relates to the field of computer software, and more particularly to a computer program and method for speakers, such as a presentation control method.

BACKGROUND

Presentations are a fundamental part of business, from customer presentation to employee briefing. Those that have been formally trained as executives or as speakers can draw on large amounts of experience and can give slick, well structured presentations. Members of staff whose line of work is not primarily customer facing, however, do not receive the same level of training, which can result in shaky, nervous delivery, poor time management, and an overall apparent lack of professionalism, despite actually having an excellent knowledge of the subject matter being presented.

SUMMARY

A method for analyzing a presentation structure and content includes, but is not limited to: providing a presentation markup, the presentation markup including: creating a presentation ontology for a presentation key point, the ontology including one or more phrases, sentences, or paragraphs describing the presentation key point; receiving one or more logical attributes for the presentation key point; assigning a time value and an importance weight to a presentation key point utilizing the one or more logical attributes; generating a summary of the presentation, the summary including a plurality of core points within the presentation key point; identifying words from the one or more local attributes during the presentation; detecting a logical attribute during the presentation and marking the local attribute as located; detecting a presenter behavior pattern; detecting a presenter speech pattern; providing a real-time notification of at least one of the presenter behavior pattern or the presenter speech pattern via an external device having a display viewable to the presenter but not to an audience; recording voice input of the presentation; logging a start and end time for a logical attribute of the presentation; providing an analysis of the presentation generated by analyzing at least one key point in the presentation; and providing an edited playback of the presentation.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

The disclosure is directed to a method 100 for verifying the structure and content of a presentation. For instance the method 100 may verify that a presentation is focused on a single or simple set of key messages the presenter wishes to impart. The method 100 may provide a correctly timed delivery of a presentation including key points. The method 100 may also provide detection and notification of physical and verbal mannerisms. In the event of overrunning the time, the method 100 may dynamically refactor a summary based upon the messages and/or core points that have been presented. The method 100 may also provide a presentation score to the presenter. The score may allow the presenter to judge himself against others and previous performances. The method 100 may also provide playback functionality, allowing the presenter to play back an entire presentation or parts of the presentation based around the logical attribute/core point/core message structure. Playback functionality may allow a user to understand why the provided presentation score for an aspect of the presentation was low, average, and/or high.

Figure 1A:
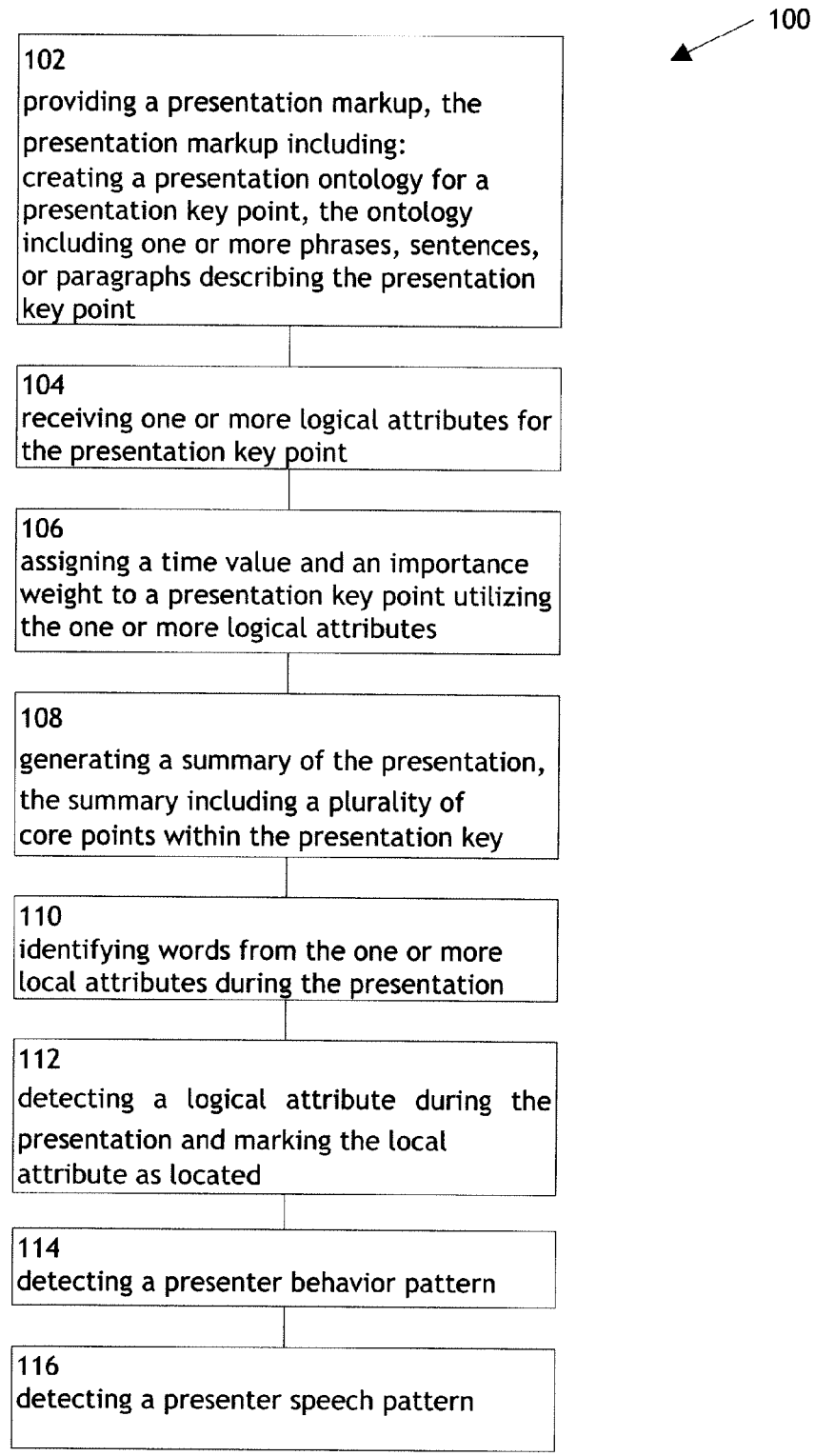
FIGS. 1A and 1B are flow diagrams illustrating a method for a mechanism that assists with improving presentation skills.
Figure 1B:
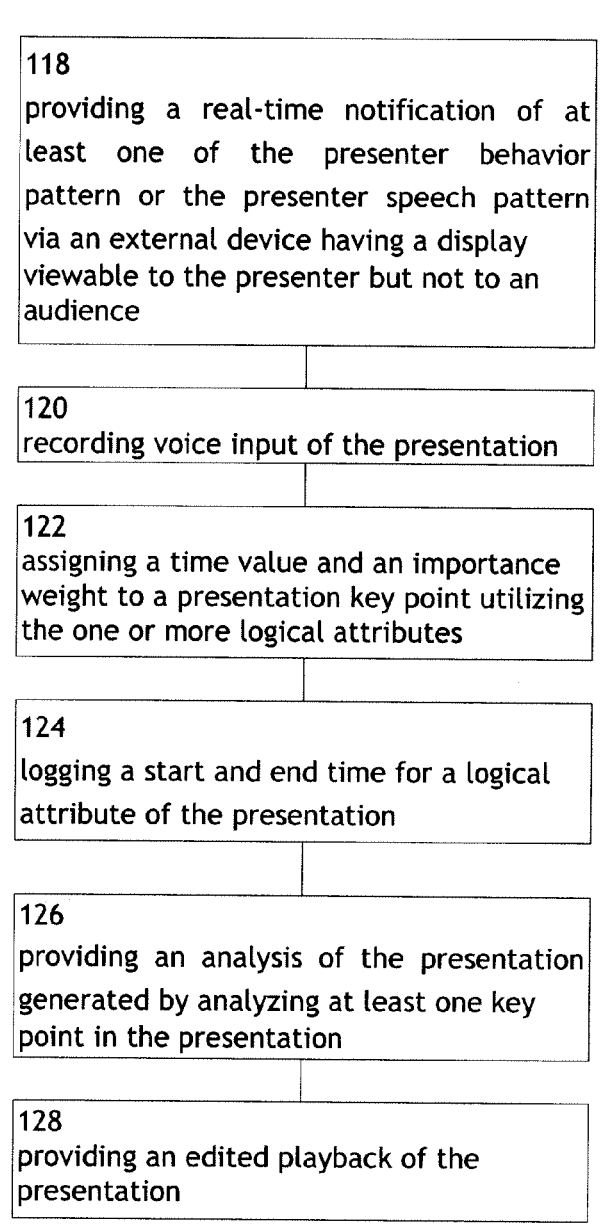

FIGS. 1A and 1B are flow diagrams illustrating a method for a mechanism that assists with improving presentation skills. Referring to FIG. 1A, method 100 may include providing a presentation markup, the presentation markup including: creating a presentation ontology for a presentation key point, the ontology including one or more phrases, sentences, or paragraphs describing the presentation key point 102. Method 100 may provide the presentation markup during the writing of a presentation, during the presentation, and/or after an existing presentation has been imported. Method 100 may create an ontology for a presentation key point, message, theme, and/or conclusion via a graphical assistance engine. The ontology may include one or more phrases, sentences, and/or paragraphs describing the key point or message of the presentation. The message may be supported by core points, each of which explain or support the message. Method 100 may utilize graphical assistance engine to clarify the message, theme, and/or conclusion being presented during the presentation, as well as at least one of the core points determined to best portray the message, theme, and/or conclusion. For instance, method 100 may establish, via the graphical assistance engine a system by which the graphical assistance engine validates all or at least one point made in the presentation. When traversing the presentation, the method 100 may add a logical attribute to at least one key point of the presentation (e.g. a bullet point in a PowerPoint presentation). Method 100 may also suggest removal of a bullet point if the graphical assistance engine is unable to link the logical attribute to a core point.

Method 100 may include receiving one or more logical attributes for a presentation key point 104. For instance, a user may enter the logical attribute. The logical attribute may be a grammar recognizable by the method 100, for instance, via speech recognition software. The grammar may be a description of a language describing which of a possible sequence of symbols (strings) in a language actually constitute valid words or statements in the language. The grammar may also be utilized to analyze the strings of the language. Using one or more grammars, the method 100 may assign a time value (i.e., the time an attribute is expected to occupy in the presentation), and an importance weight to each key point 106.

Method 100 may also include generating a summary whereby each of the summary points refers to a certain core point that exists in the presentation key point 108. Method 100 may add or remove logical attributes from the presentation, or adjust the length of a logical attribute to tailor the presentation to a required/desired length.

After the presentation markup is complete, the method 100 may compile the fragment grammars and hash a fragment grammar logical attributes in, for example, the format of index. For instance, the fragment grammars may be hashed accordingly: [compiled grammar key] value: [logical attribute.]. It is contemplated that fragment grammars may be hashed according to any other known hashing techniques.

Method 100 may also include identifying words from the local attributes during the presentation 110. For instance, method 100 may provide speech recognition software for identifying words from the local attributes. Method 100 may then retrieve the logical attribute and mark the structure as located 112, and subtract a logical attribute time quotient from the remaining time required. Method 100 may remove or obscure a key point when all logical attributes relating to the key point (i.e., a bullet point in a PowerPoint presentation) have been spoken. For instance, a bullet point may be greyed out through the PowerPoint server API. In this manner, method dynamically updates a chart in real time as points are covered in a presentation. Method 100 may prevent duplication of a key point whether or not a page containing the key point is in focus.

Method 100 may provide a plurality of features for assisting a presenter with a presentation. Features may be live features (e.g., the user may be notified when running ahead of/behind time). The method 100 may determine real-time presentation speed by comparing elapsed time to the sum of covered logical attributes completed/remaining respectively. Method 100 may also detect presenter behavior patterns 114 including, but not limited to hand gestures or other mannerisms. Method 100 may also detect presenter speech patterns 116 (e.g., rapid speech, slow speech), and notify a presenter of the speech pattern to slow down their speech based on syllable throughput/failure of the speech recognition software to identify against the speech. For instance, the method 100 may provide the notification on a display.

Method 100 may include providing a real-time notification of at least one of the presenter behavior pattern or the presenter speech pattern via an external device having a display viewable to the presenter but not to an audience 118. Method 100 may display key features to the presenter via a plurality of mediums. For instance, method 100 may display a key feature through a display viewable to the presenter but not to an audience, through an external device such as a PDA style device, cellular telephone, and/or computing device.

Method 100 may also display features on the presentation display viewable to the audience. For instance, method 100 may display the core points/core message in a graded graphical manner (grade based on importance weighted percentage of logical attributes covered and rendered in a color coded manner), for example. Method 100 may display prompt conformation/point coverage for the user if the user attempts to move onto a next page without covering a logical attribute. Method may remove slides marked as extras or of low importance may be removed if, for instance, the presentation is running behind time. Method 100 may also dynamically rebuild a summary based on the core points actually covered in the presentation rather than intended to be covered, increasing the professionalism of the delivery.

During the presentation runtime, method 100 may record voice input 120 (and video as well if available) and log a start and end time for each logical attribute 122. This may also be useful when presentations are being live translated to give some feedback to the presenter on how far behind the translation is lagging relative to their current position.

The method 100 may also include dynamically rebuilding the summary based on the core points actually covered in the presentation. Further, the method 100 may include dynamically rebuilding and reordering forthcoming presentation content based on the core points actually covered in the presentation prior to a given time interval. In this manner, method 100 may provide real-time presentation reordering at any time interval during the presentation. Reordering may be desired or required if, for example, a presentation is running over time, or if a key point to be presented has been covered, for example, in response to an audience question.

Method 100 may also include detecting keywords and/or topics not included in the current presentation, and utilizing the detected keywords and/or topics to trigger an import of additional content from one or more additional marked-up presentations into the current presentation. Specifically, the method 100 may include dynamically building an additional material section of the presentation based on audience questions taken at a designated point in the presentation. For example, a presenter may be required to discuss one or more points raised by the audience, for example, at the end of the presentation (e.g., marked by a "final questions" slide in a Power Point presentation). During such an identified phase of the presentation, the method may detect additional keywords and/or topics and import appropriate content either into the current presentation or via a display viewable only to the presenter. The method 100 may include also dynamically building an additional material section of the presentation based on audience questions taken at any point in the presentation.

Method 100 may provide a detailed analysis of the presentation by analyzing the key points in the presentation 126. For instance, method 100 may analyze a key point that exceeded a desired time for coverage, was covered in less time than a desired time for coverage, or lacked coverage of one or more logical attributes for the key point. Method 100 may generate a comprehensibility score based upon the statistics of how many of the key points were covered from the statistical data.

Method 100 may also provide click-to-access replay based on the key points. The method 100 may retrieve the attribute list for the key point, retrieving, for example, the earliest start and latest finish of a key point. Method 100 may also play back the presentation audio (video) for that time frame. The presenter may then either note his/her failure to put the point across effectively or to update the logical elements in the presentation so that the assessment is more fitting for the next occurrence.

Method 100 may provide edited playback of a presentation 128. Method 100 may map the content and the position of the content in the presentation. Method may adjust the presentation to change the focus or emphasis of the presentation by changing the allotted time to certain features. The replay statistics may be very useful to others when a presentation is passed on, as it often is between sales teams. This may provide further understanding of the key points of an original presenter. The replay statistics may also provide a chart of the required/desired emphasis on a slide or point in the presentation.

Method 100 may generate a model delivery profile. Method 100 may, for instance, combine the presentations of two or more presenters determined to have meet or exceed the requirements of the presentation parameters when presenting.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for analyzing a presentation structure and content comprising: providing a presentation markup, the presentation markup including:
   creating a presentation ontology for a presentation key point, the ontology including one or more phrases, sentences, or paragraphs describing the presentation key point;
   receiving one or more logical attributes for the presentation key point;
   automatically assigning a time value and an importance weight to a presentation key point utilizing the one or more logical attributes;
   automatically generating a summary of the presentation, the summary including a plurality of core points within the presentation key point;
   automatically identifying words from the one or more logical attributes during the presentation;
   automatically detecting a logical attribute during the presentation and marking the logical attribute as located;
   automatically detecting a presenter behavior pattern;
   wherein the behavior pattern is a hand gesture;
   automatically detecting a presenter speech pattern;
   automatically providing a real-time notification of the presenter behavior pattern via an external device having a display viewable to the presenter but not to an audience;
   recording voice input of the presentation;
   automatically logging a start and end time for a logical attribute of the presentation;
   automatically providing an analysis of the presentation generated by analyzing at least one key point in the presentation;
   providing an edited playback of the presentation;
   automatically clarifying a message, theme, or conclusion being presented during the presentation via the presentation key point, by determining which of a plurality of core points associated with the presentation key point bests represents the presentation key point;
   automatically establishing a system for validating a presentation key point made in the presentation;
   adding a logical attribute to the presentation key point; and
   automatically suggesting removal of a presentation key point if no link exists between the logical attribute and a core point of the presentation key point.

2. The method of claim 1, further including:
   adjusting a number of logical attributes for the presentation key point;
   adjusting a length of a logical attribute to provide a presentation having a required or desired length;
   compiling the one or more local attributes; and
   hashing the one or more local attributes in the format of index.

3. The method of claim 1, further including:
   subtracting a logical attribute time quotient for the detected logical attribute from the remaining time required.

4. The method of claim 1, further including:
   dynamically rebuilding the summary based on the core points actually covered in the presentation.

5. The method of claim 1, further including:
   dynamically rebuilding and reordering forthcoming presentation content based on the core points actually covered in the presentation prior to a given time interval; and
   dynamically building an additional material section of the presentation based on audience questions taken at a designated point in the presentation.

6. The method of claim 1, further including:
   generating a model delivery profile based on at least one analyzed presentation.

* * * * *